(12) United States Patent
Perry et al.

(10) Patent No.: US 6,379,065 B2
(45) Date of Patent: Apr. 30, 2002

(54) WRITING INSTRUMENT WITH FINGER GRIPPING DEVICE

(75) Inventors: Gordon Perry, New York, NY (US);
Marc W. Lovejoy, Milford, CT (US);
Craig M. Stevens, Bethany, CT (US);
Roger F. Lockshier, Monroe, CT (US)

(73) Assignee: BIC Corporation ( * ) Notice: Subject to any disclaimer, the term of this patent is extended or adjusted under 35 U.S.C. 154(b) by 0 days.

(21) Appl. No.: 09/745,647

(22) Filed: Dec. 22, 2000

Related U.S. Application Data

(63) Continuation of application No. 09/048,280, filed on Mar. 26, 1998, now Pat. No. 6,164,855.

(51) Int. Cl.$^7$ ........................ B43K 23/008; B43K 23/12
(52) U.S. Cl. ............................. 401/6; 401/88; 401/98; 401/243
(58) Field of Search ................ 401/6, 88, 98, 401/243; 15/443; D19/43, 48; 16/407, 430, 902, DIG. 18, DIG. 19

(56) References Cited

U.S. PATENT DOCUMENTS

| | | | |
|---|---|---|---|
| 3,788,754 A | 1/1974 | Glasa | |
| 3,813,729 A | 6/1974 | Szabo et al. | 16/119 |
| 4,035,089 A | 7/1977 | Schwartz et al. | 401/6 |
| 4,167,347 A | 9/1979 | Hoyle | 401/88 |
| 4,522,522 A | 6/1985 | Zeitelhack | 401/88 |
| 4,523,781 A | 6/1985 | Brody | 294/1 |
| 4,601,598 A | 7/1986 | Schwartz et al. | 401/6 |

(List continued on next page.)

FOREIGN PATENT DOCUMENTS

| | | | | |
|---|---|---|---|---|
| DE | 2157175 | 5/1973 | | 401/6 |
| FR | 1253384 | 1/1961 | | 401/6 |
| FR | 2622512 | 5/1989 | | 401/6 |
| JP | 55-115884 | 8/1980 | | 401/6 |
| JP | 57-24522 | 5/1982 | | 401/6 |
| JP | 403292200 A | 12/1991 | | 401/6 |

OTHER PUBLICATIONS

BT Office Products, GSA Federal Supply Schedule Contract No. GS–14F–0172D, p. 227, 1999.
Uni–ball Roller Grip Pen #60728; first consumer sale in Fall, 1998, approximate shipping date to retailer between Apr. 1, 1998 and Jul. 1, 1998.
Reis, 1998, *Modern Plastics Encyclopedia* 75(12):D–92.
Pilot Dr. Grip Retractable Ball Point Pen#36101; sale in Japan ca. 1995.
Schwan Stabilo Catalog 1992/93, 2 pages, 1992.
Plastics Engineering Handbook, Fifth Edition, Edited by Michael L. Beras, 1991, Van Nostrand Reinhold, New York.
Co–injection (sandwich) molding, www.scudc.scu.edu/cm-doc/dg_doc/develop/process/molding/b2200001, p.1.
Milacron Plastics Technologies Group, Processing Capabilities, 2–Component Injection Molding, pp. 1–3.

*Primary Examiner*—David J. Walczak
*Assistant Examiner*—Kathleen J. Prunner
(74) *Attorney, Agent, or Firm*—Pennie & Edmonds LLP (57) ABSTRACT

A writing instrument is provided including a cartridge carrying a writing or highlighting medium, and a writing tip exposed at one end of the cartridge. The cartridge includes a reduced cross-section which forms an annular recessed and tapered cavity. A gripping member is received in the cavity and is preferably tubular in shape and is tapered to follow the tapered contour of the cartridge. The gripping member includes a smooth surface which may include a slightly elevated or raised pattern. The elevated pattern may comprise a plurality of interconnected parts so as to form a continuous lattice or pattern such as hexagons. The pattern is preferably continuous over the entire smooth surface. The elevated pattern is resiliently compressible with respect to the smooth surface so that a user's fingers may deform the elevated pattern to provide additional traction during use. The writing instrument may also include a vented cap.

32 Claims, 5 Drawing Sheets

U.S. PATENT DOCUMENTS

| | | |
|---|---|---|
| D286,650 S | 11/1986 | Fischer .................. D19/55 |
| D298,439 S | 11/1988 | Rusk ..................... D19/55 |
| 4,791,702 A | 12/1988 | McVey .................. 16/114 B |
| 4,932,800 A | 6/1990 | Lin et al. ................ 401/6 |
| 5,000,599 A | 3/1991 | McCall et al. ........... 401/6 |
| D318,295 S | 7/1991 | Sze ...................... D19/55 |
| 5,056,945 A | 10/1991 | Klodt .................... 401/6 |
| D324,236 S | 2/1992 | Gomez ................... D19/48 |
| H1050 H | 5/1992 | Petrillo .................. 401/6 |
| D328,918 S | 8/1992 | Buda et al. .............. D19/49 |
| 5,143,463 A | 9/1992 | Pozil et al. ............... 401/6 |
| 5,186,564 A | 2/1993 | Fuhrmann, III et al. ..... 401/202 |
| D335,306 S | 5/1993 | Poisson et al. ........... D19/48 |
| 5,221,152 A | 6/1993 | Chuang ................... 401/57 |
| 5,230,578 A | 7/1993 | Fuhrmann, III et al. ..... 401/202 |
| D338,039 S | 8/1993 | Takahashi ................ D19/51 |
| D338,915 S | 8/1993 | Willat ................... D19/51 |
| D341,622 S | 11/1993 | Poisson .................. D19/48 |
| D342,968 S | 1/1994 | Meinke ................... D19/55 |
| D358,170 S | 5/1995 | Osada .................... 401/6 X |
| D359,757 S | 6/1995 | Inami et al. .............. D19/51 |
| 5,468,083 A | 11/1995 | Chesar ................... 401/6 |
| 5,530,989 A | 7/1996 | Remmert et al. .......... 16/110 R |
| 5,558,452 A | 9/1996 | Oka et al. ................ 401/6 |
| D377,050 S | 12/1996 | Azeez .................... D19/49 |
| 5,599,127 A | 2/1997 | Fuhrmann, III et al. ..... 401/202 |
| D385,914 S | 11/1997 | Shimizu .................. D19/48 |
| 5,735,622 A | 4/1998 | Melnick et al. ........... 401/88 X |
| D395,674 S | 6/1998 | Boix Gacia ............... D19/51 |
| 5,924,810 A | 7/1999 | Rukan et al. ............. 401/209 |
| 5,988,909 A | 11/1999 | Luke, Jr. et al. .......... 401/6 |
| 6,056,462 A | 5/2000 | Fukai et al. .............. 401/6 |
| 6,062,753 A | 5/2000 | Hadtke et al. ............. 401/6 |

WRITING INSTRUMENT WITH FINGER GRIPPING DEVICE

This is a continuation of application Ser. No. 09/048,280, filed Mar. 26, 1998, now U.S. Pat. No. 6,164,855.

TECHNICAL FIELD

The present invention relates generally to writing instruments such as ink pens, pencils, felt tip markers and the like. More specifically, this invention relates to a writing instrument having a gripping device thereon.

BACKGROUND OF THE INVENTION

Handwriting remains an important and useful skill and manual writing instruments remain important tools. Most writing instruments include an elongated tube containing a writing medium, such as ink or pencil lead, or highlighting medium, such as yellow, green and pink highlighters or the likes, and having an end at which the writing or highlighting medium is exposed for contact with the writing surface, such as paper. The elongated tube section of the writing instrument, which is grasped and held by the user when writing, is characterized typically by a smooth, exterior surface. The smooth surface may be attractive and pleasant to the touch, but it can be become slippery during use resulting in writer discomfort and impaired legibility of the handwritten text produced.

Devices are known in the prior art to assist a user in manually gripping a writing instrument. U.S. Pat. No. 4,601,598 to Schwartz et al., U.S. Pat. No. 5,468,083 to Chesar, U.S. Pat. No. 4,167,347 to Hoyle, and U.S. Pat. No. 4,932,800 to Lin et al. illustrate pen or pencil attachment devices which may be attached to the writing instrument in an attempt to reduce writer discomfort, cramp and fatigue. These writing aids are typically structures designed to fit over the exterior of a writing instrument. These independent structures which are slid onto the exterior of the instrument tend to be bulky and thick, and create a non-uniform surface constraining the user to hold the writing instrument in a fixed position.

Other structures have contoured grip surfaces constituting complex molded surfaces aimed at approximating the anatomical contours of a writer's fingertips during grasping of the writing instrument. However, the grip surfaces are not able to match the differing anatomical shapes and pen grasping techniques of different individuals.

U.S. Pat. No. 5,221,152 to Chuang discloses a writing instrument having a gripping segment on a section of the pen, which screws onto a portion of a main body of the writing instrument. The gripping segment comprises a number of annular slip-preventing grooves axially disposed on its outer peripheral surface to help retain the instrument to the material or surface it is clipped to. It is not concerned with providing comfort and ease to the user of the instrument when writing.

U.S. Pat. No. 5,000,599 to McCall et al. discloses a writing instrument having a deformable gripping portion, which deforms in response to manual pressure during manual grasping of the instrument to permit reshaping of the gripping portion from an initial shape to a custom fit shape generally conforming to the writer's fingertips. The gripping portion retains the custom fit shape for a short period after release and returns substantially to its initial shape. During operation, the gripping portion requires pressure to be applied at the onset to conform the gripping portion to the shape desired by the user.

Thus, there remains a need to provide a gripping surface for a writing instrument which is consistent and uniform with the surface of the writing instrument, is comfortable and easy to use, provides a firm grip and does not require excessive pressure to conform the shape desired by the user.

SUMMARY OF THE INVENTION

These objects and advantages as well as other objects and advantages are accomplished in a writing instrument including an elongated cylindrical body preferably in the form of a cartridge element carrying a writing or highlighting medium therein and having a writing tip exposed at one end. The cartridge element is insertable into a barrel member and may be permanently bonded to the barrel or releasably attached so that a replacement cartridge may be inserted into the barrel member when the writing or highlighting medium therein is depleted.

In a preferred embodiment of the invention the cartridge element includes a reduced cross-section thereon which forms an annular recessed tapered cavity. A gripping member is received by the cavity. The gripping member is preferably tubular in shape and is tapered to follow the tapered contour of the cartridge element. Gripping member may be permanently attached to the annular recessed cavity by means of co-extrusion, two-component injection molding, or by chemical or mechanical bonding.

The gripping member has a smooth surface which may include a slightly elevated or raised pattern thereon. Preferably, the elevated pattern may be constructed in the form of hexagons having sides which are contiguous with neighboring hexagonal sections and are interconnected so as to form a continuous lattice or pattern of hexagons on the smooth surface. The pattern is preferably continuous over the entire smooth surface. Moreover, the pattern may be formed from shapes which are not connected, but which are disposed throughout the smooth surface.

The elevated pattern formed on the smooth surface provides friction between the gripping section and a user's fingers, and is resiliently compressible by the user's fingers for an improved grip. When in use, the writing instrument is grasped by a user at the gripping section. The gripping section provides a soft, textured and compressible surface which is comfortable to the touch and is not prone to slippage between the user's thumb and fingers. Since the gripping surface is permanently attached to the body of the pen, the possibility of having the gripping member becoming loose during use is greatly reduced. In another aspect of the invention, a cap may be provided on the cartridge element and fitted over the gripping member and the writing tip to cover same.

BRIEF DESCRIPTION OF THE DRAWINGS

Features of the present invention are disclosed in the accompanying drawings, wherein similar reference characters denote similar elements throughout the several views, and wherein.

DETAILED DESCRIPTION OF THE INVENTION

Figure 1:
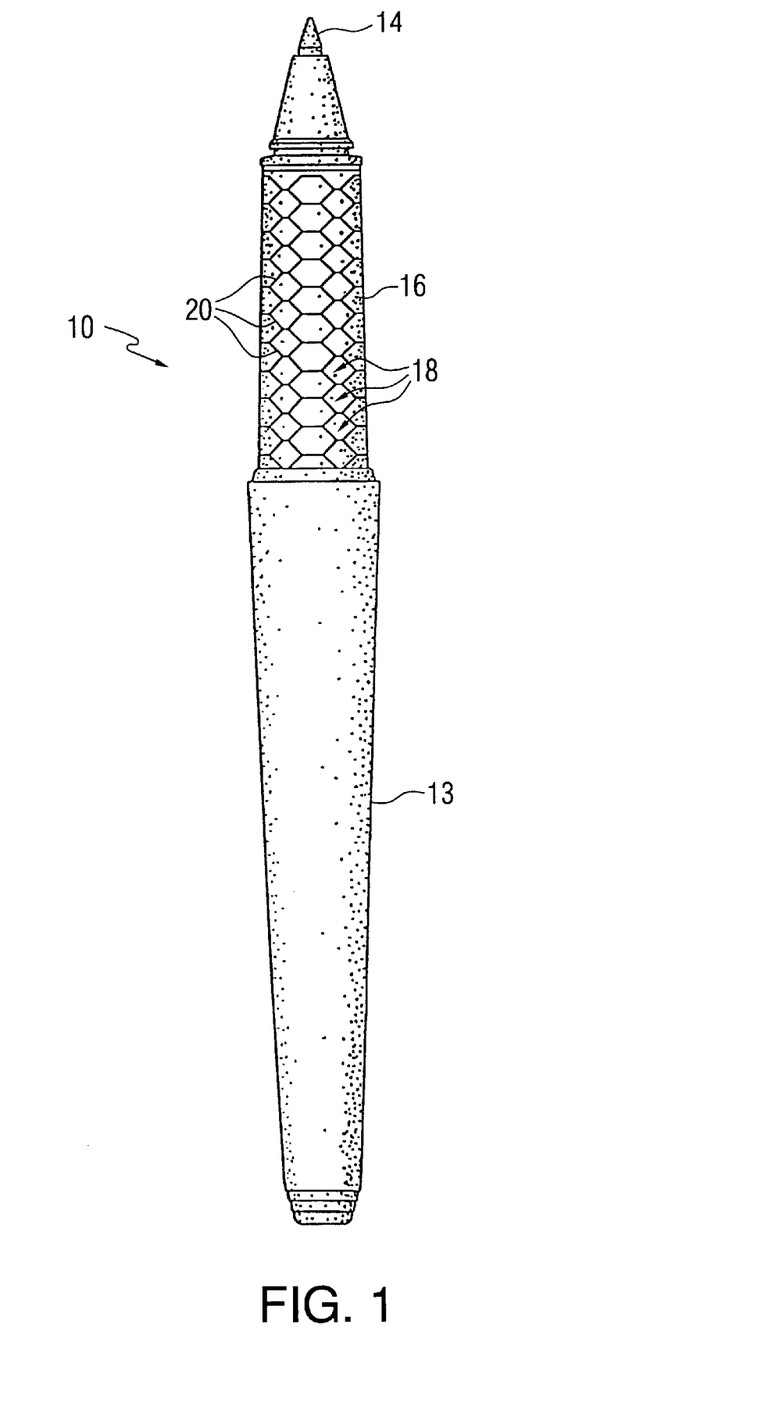
FIG. 1 is a front view of the writing instrument of the present invention showing the gripping section thereon.
Figure 2:
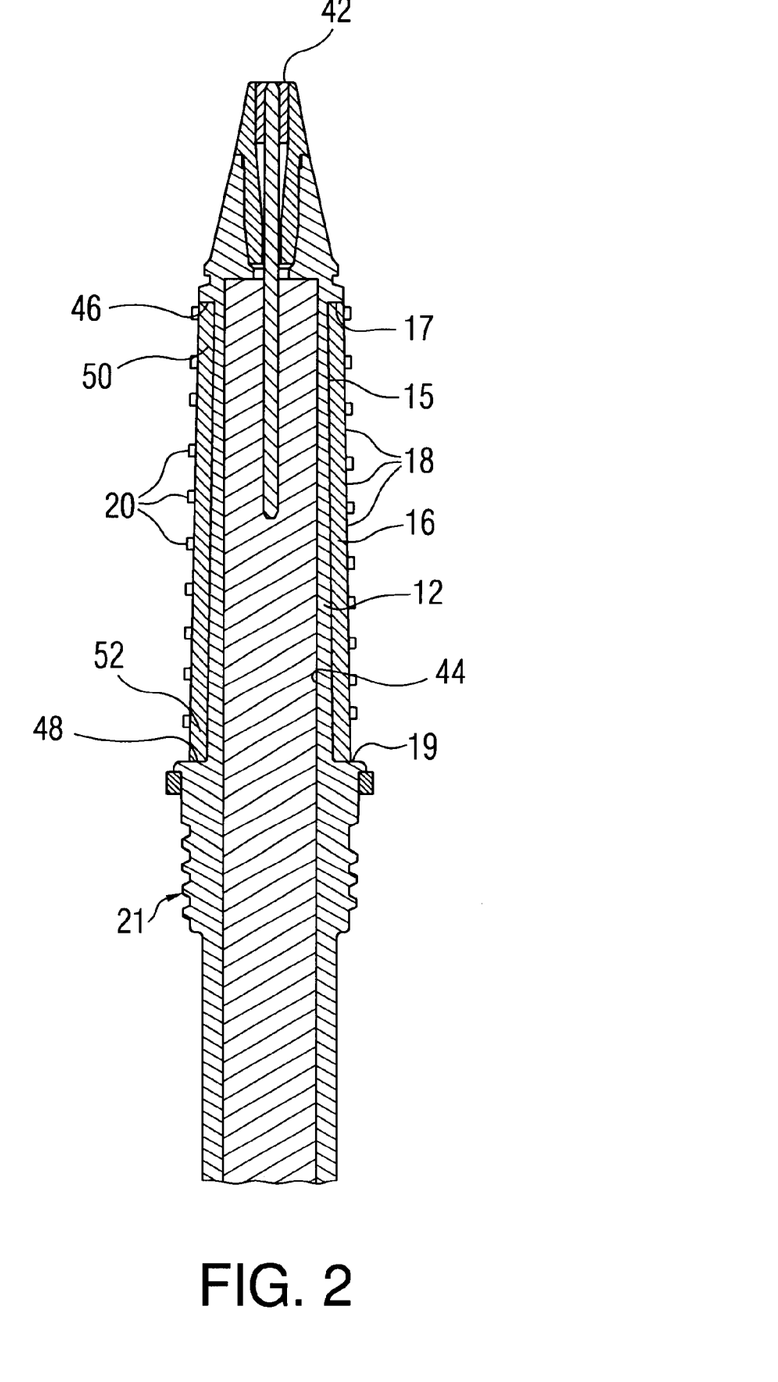
FIG. 2 is a partial sectional view of the writing instrument shown in FIG. 1 illustrating the features of the gripping section.
Figure 3:
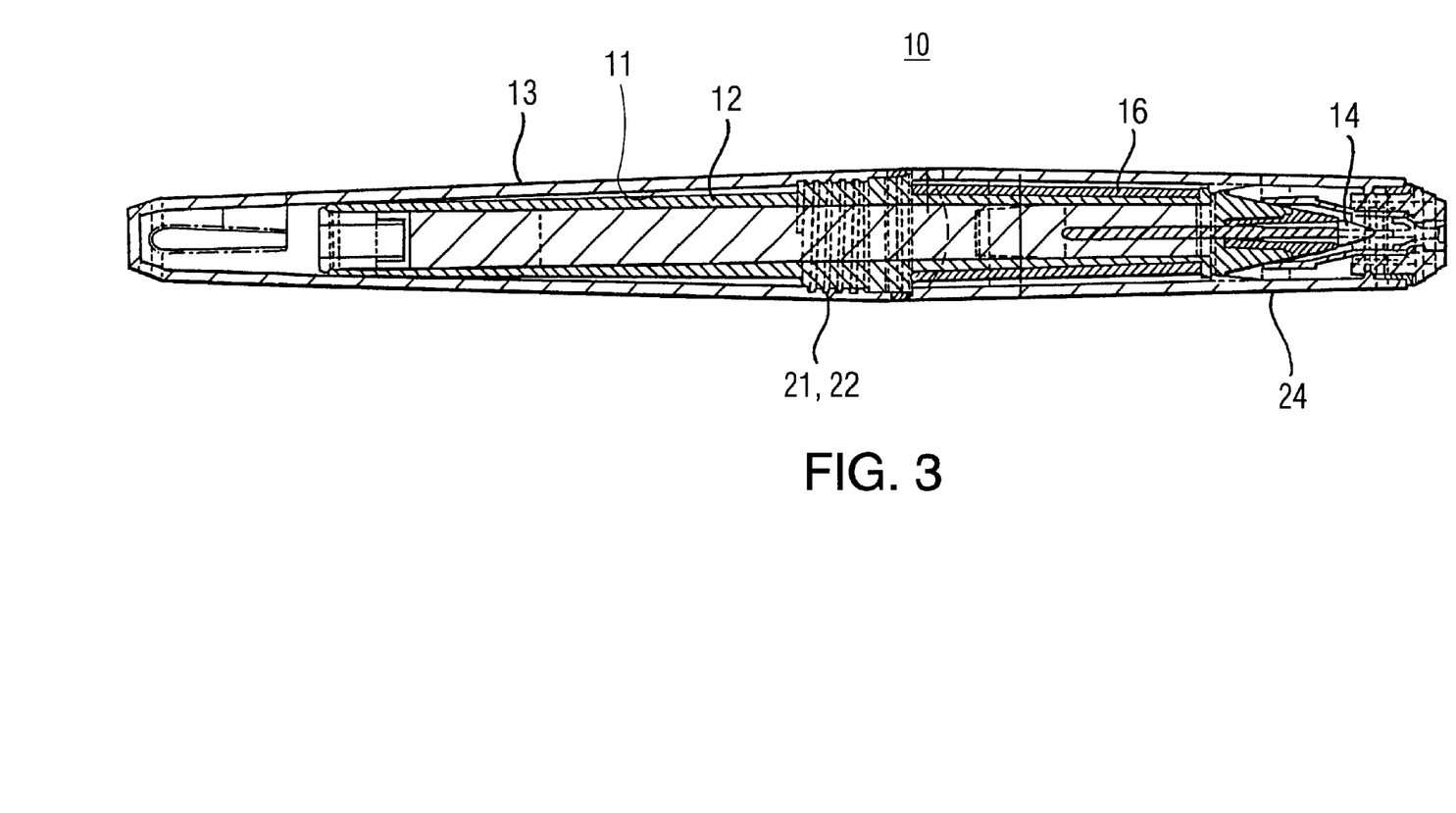
FIG. 3 is a sectional view of the writing instrument of FIG. 1 shown with a cap member thereon.

Turning to FIGS. 1 through 3, an embodiment of a writing instrument 10 constructed in accordance with the present invention is shown with the understanding that those of ordinary skill in the art will recognize many modifications and substitutions which may be made to various elements.

Writing instrument 10 generally includes an elongated cylindrical body 12 preferably in the form of a cartridge element carrying a writing or highlighting medium therein and having a writing tip 14 exposed at a tip opeining 42 at one end of the cartridge element. Elongated body 12 of FIG. 2 is hollow and tubular in shape and has an axial bore extending longitudinally therethrough. Cartridge element 12 is insertable into a barrel member 13 and may be permanently bonded thereto or releasably attached so that a replacement may be inserted into barrel member 13 when the writing highlighting medium therein is depleted. Methods of attachment include but not limited to press fitting, snap fitting, chemical bonding and ultrasonic bonding. Additionally, it is preferred that cartridge element 12 comprises threads 21, as shown in FIG. 2, configured and dimensioned to be received by corresponding internal threads 22 defined on the inside of barrel 13, as shown in FIG. 3, so that barrel 13 and cartridge element 12 can be releasably attached to each other. Writing instrument 10 may also include a writing or highlighting medium that is retractable with respect to cartridge element 12, so that the writing or highlighting medium may be selectively positioned outside cartridge 12 when writing is desired and be retracted into cartridge 12 for storage and transport.

In a preferred embodiment of the invention and as depicted in FIG. 1, cartridge element 12 includes a reduced cross-section, which forms an annular recessed tapered cavity 15. The recessed cavity 15 has a first end wall 46 adjacent writing tip 14 and a second end wall 48 axially spaced therefrom. Gripping member 16 has a first end 50 and a second end 52 positioned between the first end wall 46 and second end wall 48 of recessed cavity 15. Gripping member 16 is positioned on elongated body 12 adjacent tip opening 42, and in FIG. 2 is received in cavity 15 and flush with a stepped member 17 on body 12 adjacent first end wall 46. As shown stepped member 17 has a diameter that is slightly less than the diameter of raised section 19 of body 12 adjacent second end wall 48, such that raised section 19 can facilitate the insertion of a cap member, as discussed below. Preferably, gripping member 16 is suitably dimensioned and shaped to fit smoothly within recess 15 of cartridge element 12. Gripping member 16 is also preferably tubular in shape and is tapered to follow the tapered contour of cartridge element 12. Preferably, gripping member 16 is fabricated of a thermoplastic elastomer, including but not limited to polypropylene, rubber, polyurethane, polyisobutylene, polybutadiene. Moreover, in order to provide comfort and ease during operation of the writing instrument, it is important that gripping member 16 be of a suitable softness. The gripping member is preferably fabricated of a material which is softer than the material of the writing instrument body. Preferably, the hardness of the material of gripping member 16 is in the range of Shore A hardness of 3 to 40 durometer, and more preferably in the range of 3 to 25 durometer, and most preferably in the range of 3 to 15 durometers. However, the gripping member may also have a hardness of less than 3 durometer.

Figure 7:
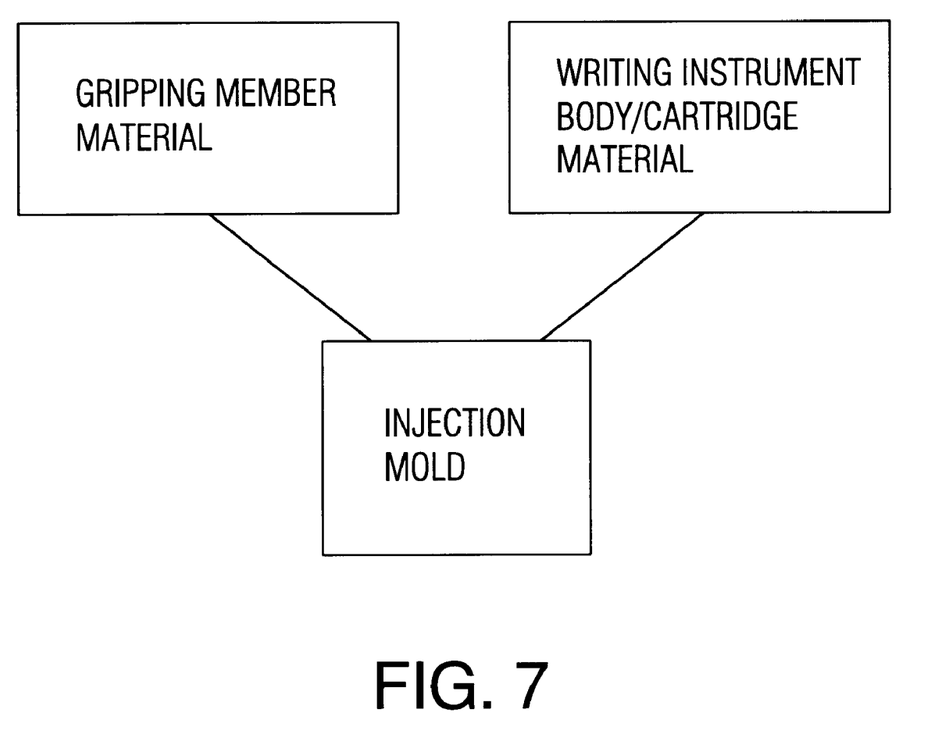
FIG. 7 is a block diagram schematically showing a method of co-injection or two-component or two-step injection molding a writing instrument with a gripping member.

Gripping member 16 is adhered to cartridge element 12 by kinetic, ultrasonic or laser welding. Alternative methods of adhering gripping member 16 to cartridge element 12 include but are not limited to solvent bonding and co-injection molding. The gripping member and the cartridge element may also be manufactured by a two-component injection molding process, which produces a chemical bond between these two members. A co-injection or two-component or two-step injection molding process is schematically illustrated in FIG. 7.

Gripping member 16 has a smooth surface 18 which may include a slightly elevated or raised pattern thereon. Preferably, the pattern comprises a plurality of slightly elevated sections 20, the pattern may extend over an entire peripheral portion of the smooth outer surface. In the illustrated embodiment of FIG. 1, the elevated sections 20 comprise interconnected polygons. As shown in FIG. 1, elevated sections 20 are in the form of hexagons having sides which are contiguous with neighboring hexagonal sections and interconnected so as to form a continuous lattice or pattern of hexagons on smooth surface 18. The pattern is preferably continuous over the entire smooth surface 18. The elevated pattern 20, which preferably has less surface area than the smooth surface 18, is resiliently deformable by the user's fingers, so that additional traction between the gripping member and the user's fingers is provided in addition to the friction between the gripping member and the user's fingers. Moreover, the pattern may be formed of shapes which are not connected, but which are disposed continuously throughout smooth surface 18.

When in use, the writing instrument is grasped by a user at the gripping section. The gripping section provides a soft, textured surface which is resiliently deformable and is therefore not prone to slippage between the user's thumb and fingers. Since the gripping surface is permanently attached to the body of the pen the possibility of having the gripping member becoming loose during use is greatly reduced. The thickness of gripping member 16 is preferably in the range of 0.50 to 2.0 mm as measured from smooth surface 18 to elevated sections 20. The elevated pattern 20 is preferably the range of 0.1 to 0.5 mm as measured from smooth surface 18.

As shown in FIG. 3, another aspect of the invention includes a cap 24 provided on cartridge element 12, which is dimensioned to fit over at least a portion of gripping member 16 and writing tip 14 to cover same. Preferably, cap 24 cooperates with raised section 19 to ensure a tight connection between cap 24 and cartridge 12. Gripping member 16 is of sufficient size, shape and thickness to provide a comfortable, flexible surface having anti-slip properties. It is not bulky to grip, is able to fit neatly on cartridge 12 and can be easily covered by cap 22.

Figure 4:
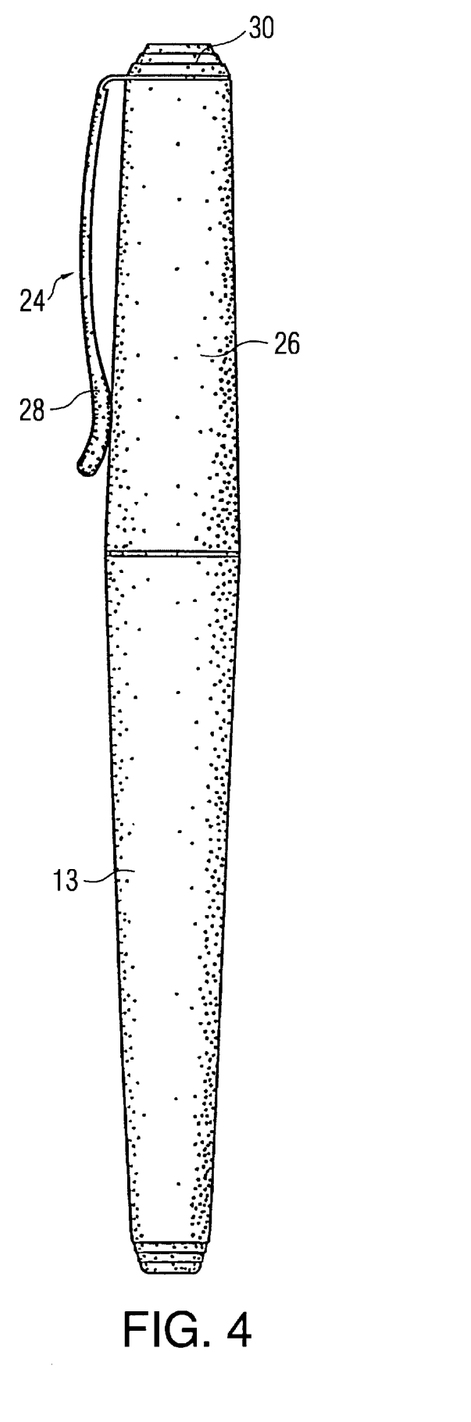
FIG. 4 is a front view of the writing instrument shown in FIG. 1 with the cap member.
Figure 5:
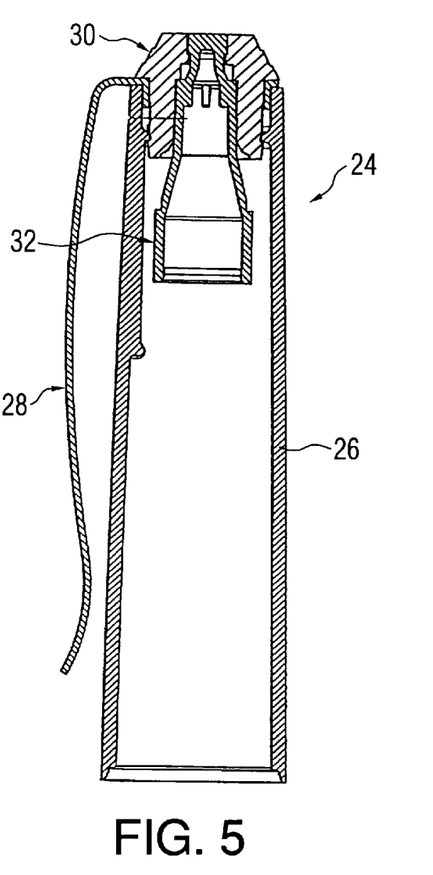
FIG. 5 is a cross-sectional view of the cap member.
Figure 6:
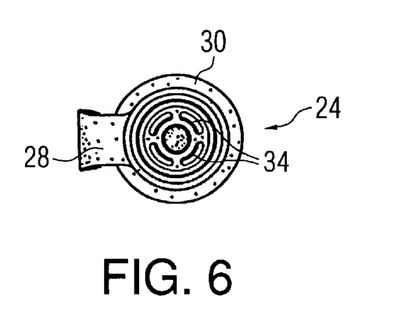
FIG. 6 is a top view of the cap member.

Referring to FIGS. 4–6, writing instrument 10 is shown with cap member 24. Cap 24 is configured and dimensioned to be releasably attached to cartridge element 12. Cap 24 protects writing tip 14 when the writing instrument 10 is not in use, and it also isolates the ink from writing tip 14 from contaminating the surrounding areas. Cap 24 comprises a hollow body 26 defining an open end, clip member 28, vented plug 30 and well 32. When not in used writing tip 14 is inserted into well 32, which is preferably attached to vented plug 30 by snap fitting, threading, chemical bonding or ultrasonic bonding. Well 32 can also be formed integrally with vented plug 30. Plug 30 defines a plurality of apertures 34 therein such that air communication is established the interior of cap 24 and the outside environment through plug 30.

The writing instrument of the present invention may be manufactured by providing a cartridge element having a writing or highlighting medium therein and a writing tip thereon. A tubular shaped gripping member is provided and is adhered to the cartridge element by a two-step injection molding process to chemically bond the gripping member to the cartridge element. Alternatively, the gripping member may be mechanically bonded to the cartridge element by laser or ultrasonically welding or solvent bonding the member to the cartridge element.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A writing instrument comprising:
   an elongated writing instrument body; and
   a gripping member;
   wherein said gripping member:
      has a smooth outer surface positioned to be gripped by a user;
      is formed from an elastomeric material; and
      is adhered to said elongated body by one of welding, solvent bonding, or a co-injection to two-step or two-component injection molding process.

2. The writing instrument of claim 1, wherein said gripping member has a plurality of elevated sections comprising interconnected polygons.

3. The writing instrument of claim 1, wherein said gripping member has a plurality of elevated sections forming a continuous lattice over an entire peripheral portion of the smooth outer surface of said gripping member.

4. The writing instrument of claim 1, further comprising a cap, wherein said gripping member is configured and dimensioned to be received by said cap.

5. The writing instrument of claim 4, wherein said gripping member has a Shore A hardness of less than 40 durometer and is completely covered by said cap upon insertion of said gripping member into said cap.

6. The writing instrument of claim 1, wherein said gripping member has a plurality of elevated sections raised in the range of 0.1 to 0.5 mm above the smooth surface of said gripping member.

7. The writing instrument of claim 1, wherein said gripping member is fabricated of a material which is softer than the material of said writing instrument body.

8. The writing instrument of claim 7, wherein said gripping member has a Shore A hardness of less than 40 durometer.

9. The writing instrument of claim 8, wherein said gripping member has a Shore A hardness of less than 3 durometer.

10. The writing instrument of claim 8, wherein said gripping member has a Shore A hardness of 3 to 15 durometer.

11. The writing instrument of claim 1, wherein said elastomeric material is a thermoplastic elastomer.

12. The writing instrument of claim 1, wherein said writing instrument further comprises a vented cap member.

13. The writing instrument of claim 1, wherein said gripping member has a plurality of elevated sections formed to be resiliently deformable to provide additional traction between said gripping member and a user's fingers.

14. The writing instrument of claim 1, wherein:
   said writing instrument has a writing tip;
   said elongated body further comprises a recessed cavity having a first end wall adjacent said writing tip and a second end wall axially space therefrom; and
   said gripping member further comprises first end and a second end positioned between said first and second end walls of said recessed cavity.

15. The writing instrument of claim 14, further comprising:
   a stepped member adjacent said first end wall of said recessed cavity and a raised second adjacent said second end wall of said recessed cavity;
   wherein said gripping member is positioned between said stepped member and said raised section;
   said gripping member is flush with said stepped member; and
   said raised section is elevated above said gripping member.

16. The writing instrument of claim 15, further comprising a cap, wherein:
   said cap is dimensioned to fit over said writing tip and at least a portion of said gripping member and to be releasably attached to said writing instrument.

17. The writing instrument of claim 1, wherein said gripping member is formed such that said gripping member is adhered to said elongated body as a result of the formation of said gripping member.

18. The writing instrument of claim 1, wherein said gripping member is adhered to said elongated body by the co-injection or two-step or two-component injection molding process such that the possibility of having the gripping member become loose during use if greatly reduced.

19. A writing instrument comprising:
   an elongated body having a tip opening and being shaped to carry a writing or highlighting medium therein, wherein said elongated body defines an annular recessed cavity therearound;
   a gripping method received in said annular recessed cavity and permanently attached thereto by co-injection molding; and
   a writing or highlighting medium carried within said elongated body and having a writing tip exposed at said tip opening.

20. The writing instrument of claim 10, wherein said elongated body is hollow and tubular in shape with an axial bore extending axially therethrough.

21. The writing instrument of claim 19, wherein said gripping member is positioned on said elongated body adjacent said tip opening.

22. The writing instrument of claim 19, wherein said gripping member is fabricated of a thermoplastic elastomer.

23. A writing instrument comprising:
   an elongated body with a writing tip at one end; and an elastomeric gripping member adhered to said elongated body by one of welding, solvent bonding, or a co-injection or two-step or two-component injection molding process.

24. The writing instrument of claim 23 further comprising:
- a barrel member;
- wherein:
  - said elongated body is releasably attached to said barrel member;
  - a writing or highlighting medium is carried within said elongated body;
  - said writing tip is provided at an end of said elongaetd body; and
  - said gripping member remains with said elongated body upon detaching said elongated body from said barrel member.

25. The writing instrument of claim 23, wherein said gripping member is adhered to said elongated body by the co-injection or two-step or two-component injection molding process such that the possibility of having the gripping member become loose during use is greatly reduced.

26. The writing instrument of claim 23, wherein said gripping member has a thickness in the range of 0.5 mm to 2.0 mm.

27. The writing instrument of claim 23, wherein said gripping member provides a flexible surface having anti-slip properties.

28. The writing instrument of claim 23, wherein said gripping member has a smooth outer surface and a plurality of elevated sections raised above said smooth outer surface and formed to be resiliently deformable to provide additional traction between said gripping member and a user's fingers.

29. The writing instrument of claim 28, wherein said elevated pattern is continuous over the entire smooth outer surface of said gripping member.

30. The writing instrument of claim 23, further comprising a cap wherein said cap is dimensioned to fit over said writing tip and at least a portion of said gripping member and to be releasably attached to said writing instrument.

31. The writing instrument of claim 30, wherein said elastomeric gripping member is fabricated of a thermoplastic elastomer.

32. The writing instrument of claim 31, wherein said thermoplastic elastomer is selected from the group consisting of polypropylene, rubber, polyurethane, polyisobutylene, and polybutadiene.

* * * * *

UNITED STATES PATENT AND TRADEMARK OFFICE
CERTIFICATE OF CORRECTION

PATENT NO. : 6,379,065 B2  Page 1 of 1
DATED : April 30, 2002
INVENTOR(S) : Perry et al.

It is certified that error appears in the above-identified patent and that said Letters Patent is hereby corrected as shown below:

Column 6,
Line 17, please insert -- a -- between "comprises" and "first";
Line 24, please replace "second" with -- section --;
Line 58, please replace "claim 10" with -- claim 19 --.

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,379,065 B2
DATED : April 30, 2002
INVENTOR(S) : Perry et al.

It is certified that error appears in the above-identified patent and that said Letters Patent is hereby corrected as shown below:

Column 5,
Line 40, after "co-injection" please change "to" to -- or --.

Column 6,
Line 23, after "raised" please change "second" to -- section --.
Line 44, after "during use" please change "if" to -- is --.
Line 50, after "gripping" please change "method" to -- member --.

Signed and Sealed this

Seventeenth Day of August, 2004

JON W. DUDAS
*Acting Director of the United States Patent and Trademark Office*